No. 774,263. PATENTED NOV. 8, 1904.
S. L. MITCHELL.
WAGON.
APPLICATION FILED SEPT. 17, 1903.
NO MODEL.
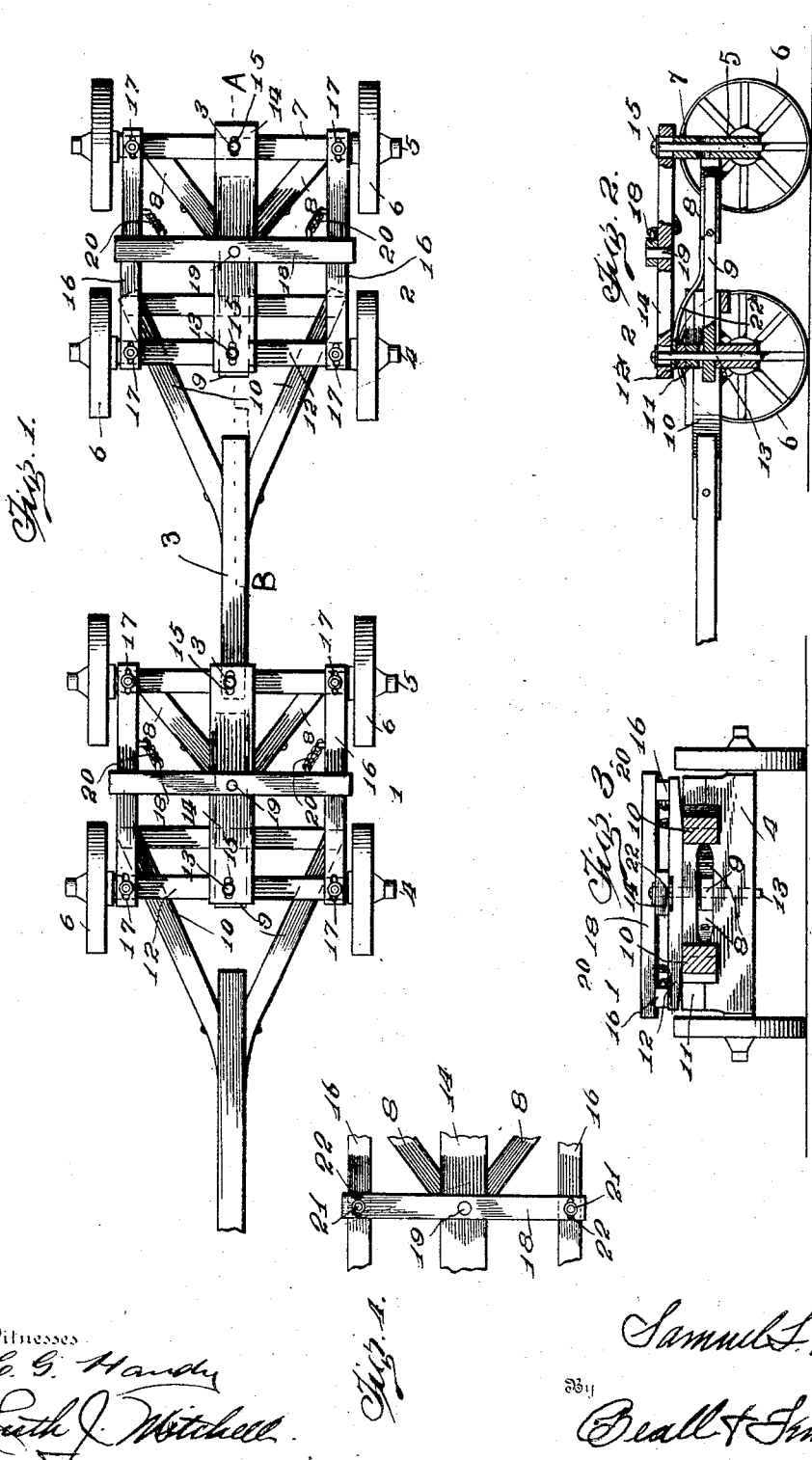
Witnesses
L. G. Hardy
Ruth J. Mitchell
Inventor
Samuel L. Mitchell
By
Beall & Fenwick
Attorneys No. 774,263. Patented November 8, 1904.

UNITED STATES PATENT OFFICE.

SAMUEL L. MITCHELL, OF COLUMBIA, MISSISSIPPI.

WAGON.

SPECIFICATION forming part of Letters Patent No. 774,263, dated November 8, 1904.

Application filed September 17, 1903. Serial No. 173,617. (No model.)

*To all whom it may concern:*

Be it known that I, SAMUEL L. MITCHELL, a citizen of the United States, residing at Columbia, in the county of Marion and State of Mississippi, have invented certain new and useful Improvements in Wagons; and I do hereby declare the following to be a full, clear, and exact description of the invention, such as will enable others skilled in the art to which it appertains to make and use the same.

My invention relates to improvements in wagons, and particularly to such as are designed for handling materials of considerable length, such as logs.

The object of the invention is to provide a truck with load-supporting means which is adapted to be independently movable upon said truck when a load is carried upon the same.

Another object of the invention is to provide a load-supporting means carried upon the trucks of a wagon of this class, said trucks and load-supporting means having independent movements. The movements of said parts are limited relative to one another by means of flexible connections.

With other objects in view the invention consists of a wagon made up of trucks pivotally connected with each other, each of the trucks being provided with a pivoted front bolster, a rear bolster, mounted upon said connecting means.

It further consists of a wagon having a truck provided with a pivoted front bolster, a rigid rear bolster, bars connecting the said bolsters, and a load-carrying bolster arranged upon said bars.

It also consists in certain other novel combinations, constructions, and arrangements of parts, as will be hereinafter fully described and claimed.

In the accompanying drawings, Figure 1 represents a view in top plan of a wagon combining features of the present invention. Fig. 2 represents a longitudinal vertical central section on the plane of line A B of Fig. 1. Fig. 3 represents a view in elevation of the front end of a wagon. Fig. 4 is a fragmentary view of another embodiment of my improved wagon.

The present invention relates to that class of wagons fully set forth in my former patent which was issued to me on the 9th day of April, 1901, and numbered 671,863, the present described structure being an improvement over that disclosed in said patent.

The wagon is preferably made up of two trucks, as 1 and 2, pivotally connected by a suitable pole 3, the front truck 1 being made in all respects like the rear truck 2, so that the description of the front truck will be applicable to the rear truck, and I will therefore describe but one truck and desire it to be understood that the description may be applied as well to the other. With this understanding, the truck 1 is made up of suitable axles 4 and 5, designed to receive traction-wheels 6 6, the rear axle 5 carrying a rigidly-secured bolster 7, between which and said axle are arranged suitable hounds 8 8. A beam, as 9, is secured between the front ends of the hounds 8 and has its front end pivotally connected to the axle 4. Secured to the axle 4 on either side of the beam 9 are the members of a suitable turn-table 10, the said turn-table being provided with a connecting rear bar upon which said beam 9 is designed to slide. Rigidly fixed above the axle 4 and embedded in the members of turn-table 10 is a bolster, as 11, designed to support a rocking bolster 12, which is mounted above the same and pivotally connected thereto by a suitable bolt, as 13, which bolt also forms the pivot for the beam 9, the said bolt being passed vertically through both of said bolsters, through said beam, and through the axle 4. Arranged centrally of the truck and pivotally attached to the bolster 12 by means of bolt 13 is a load-supporting beam 14, which extends to and is secured on the upper edge of the bolster 7 by pin-and-slot connection, as at 15, the front end of said beam being also slotted for receiving the bolt 13. At each side of beam 14 is arranged a longitudinal supporting side bar, as 16, which is connected with the rocking bolster 12 and the rigid bolster 7 by pin-and-slot connections, as 17 17.

Arranged transverely of the truck and upon the top of the beam 14 and the bars 16 16 is a load-supporting bolster 18, which is provided with a central pin 19, pivotally engaging the beam 14, and is also provided near its ends with a flexible connection, as chains 20 20, which are secured thereto by suitable means, as staples, and are also secured at one end with the bars 16 16 by similar means.

In the embodiment shown in Fig. 4 instead of the flexible connections secured near the ends of the bar 18 and to the bars 16 16 I employ bolts 21, passing through said bar 18 and the side bars 16. The bolts 21 are loosely mounted in elongated slots 22, which are formed upon the load-bolster 18 near its end. It will be obvious that the flexible connection 20, secured to the load-bolster 18 and the side bar 16, or, as shown in Fig. 4, the loose connection of said bolster 18 to the bars 16 permit of a pivotal movement by means of the central bolt 19, which secures the said bolster 18 upon the truck. This longitudinal or sliding movement of the load-bolster is limited by the flexible connection 20 or bolts 21 passing through the elongated slots 22. The bolster 18 may be of any ordinary type.

For strengthening purposes I find it desirable to provide a strap, as $22^b$, which has its front end pivotally engaging the pin 13 above bolster 12 and its rear end passed downwardly and preferably rigidly secured to beam 9.

In operation the trucks are connected up, as shown in Fig. 1, and the logs or other materials are permitted to rest upon the load-supporting bolster 18. When it is desired to turn a sharp corner, the front axle of the front truck is brought about by the movement of the pole or tongue, and the rear axle of the front truck and also of the rear truck will follow the front axle of the front truck, the pivotal mount to bolster 12 permitting the other points to swing for changing the direction of the movement of the wagon. The load being carried of course remains rigid, and it has therefore been found necessary to provide the pin-and-slot connections between the bolster 18 and the bars 16, or the flexible connection, and between bars 16 and bolsters 7 and 12, or the flexible connection, as above described, the said slotted or flexible connections permitting the parts to give sufficiently to allow the wagon to make a sharp turn without danger of overturning the load.

Having thus described my invention as fully as I am able at this time, what I claim as new, and desire to secure by Letters Patent, is—

1. A wagon, comprising a plurality of trucks, each having front and rear bolsters, one of which is pivoted, slotted side bars connecting said front and rear bolsters, and a transverse load-receiving bolster mounted above said side bars.

2. A wagon, comprising suitable axles, a fixed bolster carried by one of said axles and a pivoted bolster by the other, a beam extending from one bolster to the other, a load-carrying bolster mounted above the beam, slotted auxiliary means supporting the ends of said latter bolster, and flexible means connected with said slotted members for limiting the movement of said load-carrying bolster.

3. A wagon comprising suitable axles, a bolster carried by one of said axles, a bolster pivoted above the other, a plurality of bars connecting said bolsters having pin-and-slot connections therewith, a pivoted load-supporting bolster carried upon said connecting-bars, and provided with means for limiting its pivoted movement.

4. A wagon comprising suitable axles, a turn-table mounted upon one of said axles, a beam connecting with the other axle and pivoted to the turn-table-carrying axle and slidably engaging one member of said turn-table, a bolster mounted above the pivot end of said beam, a strap connected to the pivot of said bolster at one end and connected to the beam at the other, a bolster rigidly fixed to the other of said axles, longitudinally-movable bars having slots and pins passing therethrough connecting said bolsters together, load-carrying means mounted on said bars, and provided with flexible means for limiting the movement thereof.

5. A wagon, comprising a plurality of trucks, each truck having a fixed and a pivoted bolster, side bars slidably connected with the bolster of each truck, a load-carrying bolster mounted transversely above said bars, and flexible means connecting said load-carrying bolster with the said bars.

6. A wagon, comprising a plurality of trucks, each truck having a front and a rear truck-bolster, side bearer-bars slidably connected with each of said bolsters, and load-bearer bolsters pivoted centrally of each truck, the ends thereof being supported by the said side bearer-bars.

7. A wagon, comprising a plurality of trucks, each truck having front and rear bolsters, an approximately central longitudinal sliding member assembled with said bolsters, side members movably connected near the end portion of each of said bolsters, and a laterally-arranged load-carrying bolster extending across the central and side members.

8. A wagon, comprising a plurality of trucks, each truck having front and rear bolsters, a central connecting-bar having a pin-and-slot connection with the bolsters, side bearer-bars also having a pin-and-slot connection with the bolsters, and a transverse bed-bolster pivoted to the central bar and supported at its ends by the said bars.

In testimony whereof I affix my signature in presence of two witnesses.

SAMUEL L. MITCHELL.

Witnesses:
H. B. WELLBORN,
V. L. PRITCHARD.